United States Patent [19]

Lescher

[11] Patent Number: 4,993,512
[45] Date of Patent: Feb. 19, 1991

[54] EXHAUST DUCT PART IN PARTICULAR FOR AN INTERNAL COMBUSTION ENGINE

[75] Inventor: Henri Lescher, St Germain en Laye, France

[73] Assignee: Glaenzer Spicer, Poissy, France

[21] Appl. No.: 242,413

[22] Filed: Sep. 9, 1988

[30] Foreign Application Priority Data

Sep. 9, 1987 [FR] France ............... 87 12525

[51] Int. Cl.⁵ .......................... F01N 1/24; F01N 7/08
[52] U.S. Cl. ................................ 181/227; 181/252; 181/258; 181/180
[58] Field of Search ............... 181/227, 228, 252, 256, 181/264, 279, 280, 258

[56] References Cited

U.S. PATENT DOCUMENTS

| | | | |
|---|---|---|---|
| 1,554,534 | 9/1925 | Straussler | 181/258 |
| 1,627,324 | 5/1927 | Green | 181/258 |
| 2,613,758 | 10/1952 | Cullum | 181/256 |
| 2,646,854 | 7/1953 | Walker | 181/280 |
| 2,911,055 | 11/1959 | McDonald | 181/280 |
| 2,990,906 | 7/1961 | Audette | 181/256 |
| 3,292,731 | 12/1966 | Ballard | 181/227 |
| 3,580,357 | 5/1971 | Whitney | 181/280 X |
| 3,746,126 | 7/1973 | de Cardenas | 181/280 |
| 4,263,982 | 4/1981 | Feuling | 181/256 |
| 4,530,418 | 7/1985 | Currie | 181/227 |

FOREIGN PATENT DOCUMENTS

| | | | |
|---|---|---|---|
| 1954319 | 5/1971 | Fed. Rep. of Germany | 181/280 |
| 1226438 | 10/1958 | France | |
| 1301056 | 8/1961 | France | |
| 497779 | 9/1954 | Italy | 181/280 |
| 319626 | 9/1929 | United Kingdom | |

Primary Examiner—Benjamin R. Fuller
Attorney, Agent, or Firm—Wenderoth, Lind & Ponack

[57] ABSTRACT

An exhaust duct part for the outflow of a fluid, in particular for the outflow of the exhaust gases of an internal combustion engine, includes a continuous external casing of substantially constant cross-section and containing at least one acoustic attenuation unit positioned longitudinally in the external casing so as to delimit at least one fluid transfer section of a length determined in such a way that the transfer section participates in the acoustic attenuation function of the exhaust duct part. The attenuation unit includes an internal casing of substantially constant cross-section and, together with the external casing, delimits at least one longitudinal peripheral channel for the passage of the fluid. The internal casing has a circular or elliptical cross-section and includes at least one zone deformed radially in such a way as to increase the surface of exchange between the fluid and the attenuation unit.

44 Claims, 3 Drawing Sheets

EXHAUST DUCT PART IN PARTICULAR FOR AN INTERNAL COMBUSTION ENGINE

BACKGROUND OF THE INVENTION

The present invention relates to a part of an exhaust duct for the outflow of a fluid, in particular for the outflow of the exhaust gases of an internal combustion engine.

The parts or segments of exhaust ducts fitted to motor vehicles are of the type comprising, in succession, at least one fluid transfer section and a section containing an acoustic attenuation unit called an exhaust silencer or muffler.

The acoustic attenuation means which are employed in exhaust silencers and have recourse principally to the phenomena of absorption, reflection and interference in their totality necessitate the provision of an independent section of the exhaust duct, in which section they are arranged and to which there are connected one or more transfer sections which permit the entry and exit of the exhaust gases. A silencer is traditionally made up of a cylindrical box of large diameter to which are connected the transfer sections, the diameter of which is much smaller and which essentially fulfil only a function of transferring the gases to be treated.

This design presents numerous disadvantages. By reason of its internal design, the box of the silencer forms, for example in its lower part, a reservoir for condensates and sludge which, in combination with the significant variations in temperature to which it is subjected, cause very considerable corrosion phenomena, for the most part ending in the destruction of the silencer, necessitating replacement of this component on the vehicle to which it is fitted.

Furthermore, the concentration of the acoustic attenuation means in a casing of very large diameter has the disadvantage of concentrating a significant mass of the exhaust duct at a particular point of the exhaust duct. This causes phenomena associated with imbalance, which prejudices the reliability of the exhaust duct, of the devices for fixing the exhaust duct to the vehicle and of its connection to the engine, and generates undesirable noises during use.

An exhaust duct part comprising a silencer of this kind requires numerous welding and/or crimping operations, in particular for closing the cylindrical casing of the silencer by two transverse end plates as well as for connecting the transfer sections. These operations are complex and costly operations and impair the high-speed production of exhaust ducts.

This known design of a part of an exhaust duct which comprises at least one large-dimension silencer likewise poses numerous problems with respect to its installation on a motor vehicle and its arrangement on the lower surface of the floor of the body of the vehicle. Increasing the interior comfort of vehicles has made it necessary to arrange numerous components on the lower part of the vehicle, and in particular the fuel tank, and this further increases the problems of installing the exhaust duct. The appearance of four-wheel drive vehicles with means for transmission to the rear wheels, which occupies a considerable space, has likewise aggravated these problems.

To remedy some of the disadvantages just mentioned, a proposal has already been made in FR-A-1,301,056 for an exhaust duct for the outflow of a fluid, in particular for the outflow of the exhaust gases of an internal combustion engine, of the type comprising a continuous external casing of substantially constant cross-section and containing at least one acoustic attenuation unit positioned longitudinally in the casing so as to delimit at least one fluid transfer section of a length determined in such a way that the transfer section participates in the acoustic attenuation function of the exhaust duct part, the attenuation unit comprising a casing of substantially circular cross-section which, together with the external casing, delimits at least one longitudinal peripheral channel for the passage of the fluid.

In this reference, it is however to be noted, on the one hand, that the surface of interaction between the fluid and the attenuation unit is reduced in that it is at the maximum equal to the circular cylindrical external peripheral surface of the casing of the attenuation unit and, on the other hand, that the active path of the gas stream is equal to the length of the casing.

SUMMARY OF THE INVENTION

The object of the present invention is to propose an exhaust duct part of the type which is described and represented in FR-A-1,301,056, with improved efficiency, in particular with respect to acoustic attenuation.

To this end, the exhaust duct part according to the invention is characterized in that the casing has a circular or elliptical cross-section and comprises at least one zone deformed radially in such a way as to increase the surface of interaction between the fluid and the attenuation unit.

According to other characteristics of the invention:
the radially deformed zone extends outwardly;
the internal casing likewise comprises at least one zone deformed radially inwardly;
together with the external casing, the deformed zone delimits the longitudinal peripheral channel;
the deformed zone is a longitudinal protuberance extending radially from the external peripheral surface of the internal casing;
the deformed zone is laterally delimited by two sides which face one another;
the longitudinal peripheral channel; is a helicoidal channel
the internal casing is produced by folded seam connection of at least one strip of material and the deformed zone is formed by the profile of the folded seam extending from the periphery of the internal casing;
the internal casing is perforated substantially over its entire surface;
the internal casing contains absorbent material;
the absorbent material extends in the internal space delimited by such two facing sides or is in contact with the internal surface of such sides;
the external casing is made of a tube inside which the acoustic attenuation unit is force-fitted sleeve fashion;
the internal casing is a tubular casing in which the radially deformed zones are obtained by mechanical deformation of the box;
at least one of the ends of the exhaust duct is deformed in such a way as to form an inlet pipe or outlet pipe for the fluid;
the external casing is produced from a light alloy;
the internal casing is produced from a light alloy;
the external casing is provided with a cladding;
the internal casing is provided with a cladding;

the exhaust duct comprises a plurality of acoustic attenuation units which are positioned in succession inside the external casing and delimit attenuation sections of determined lengths;

when the exhaust duct part is used in a motor vehicle having an internal combustion engine, the continuous external casing of constant cross-section extends from the exhaust manifold of the engine as far as the outlet for the exhaust gases to the atmosphere, so as to form a complete exhaust duct;

in cross-section, the length of the contour of the external peripheral surface of the internal casing along which gas internal casing interaction occurs is greater than or equal to the length of the contour of the internal peripheral surface of the casing along which gas/external casing interaction occurs;

the ratio of the radial dimension of the axial section of the channel to the dimension of the axial length thereof is between 1 and 0.1.

The invention likewise proposes a process for producing an exhaust duct, characterized in that:

(a) the acoustic attenuation unit or units is/are positioned and fixed inside a substantially rectilinear external casing;

(b) the external casing is bent.

According to another process for producing an exhaust duct:

(a') the acoustic attenuation unit or units is/are positioned and fixed inside an external casing of circular cross-section; and (b') the external casing is at least partially deformed in order to modify the profile of its cross-section.

When a motor vehicle has an engine which is fitted with an exhaust gas manifold which comprises at least two independent outlets, each of the outlets is connected to an exhaust duct part according to the invention.

BRIEF DESCRIPTION OF THE DRAWINGS

Other characteristics and advantages of the invention will emerge upon reading the detailed description which follows, for an understanding of which reference should be made to the attached drawings, in which.

DETAILED DESCRIPTION OF THE INVENTION

Figure 1:
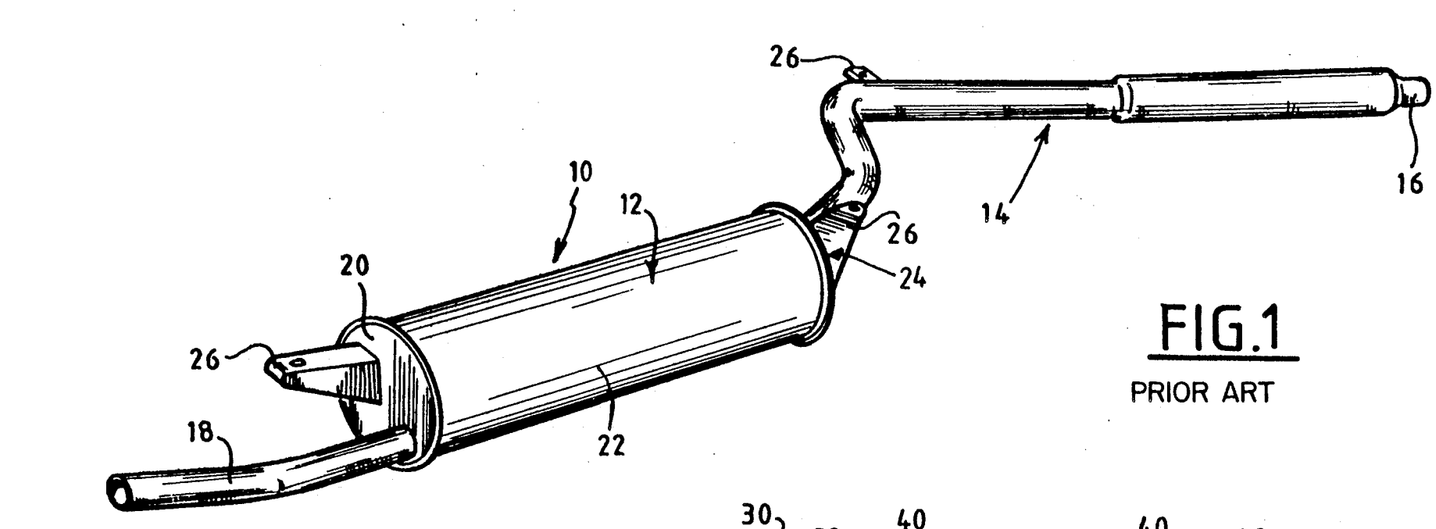
FIG. 1 is a perspective view which represents an exhaust duct part of a known type comprising a conventional silencer unit.

In FIG. 1, part of a conventional exhaust duct intended for a motor vehicle has been represented. This exhaust duct part 10 essentially comprises a unit forming a silencer or muffler 12 which is fed with exhaust gas by a transfer section 14, the end 16 of which forms an inlet pipe of the exhaust duct which can, for example, be connected to the exhaust manifold of an internal combustion engine.

After having circulated inside the silencer 12, the exhaust gases are discharged towards the atmosphere via an outlet pipe 18 fixed on an end plate 20 of the silencer 12. The silencer 12 is essentially formed by a cylindrical wall 22 of large diameter to which are fixed two end plates 20 and 24. The transfer section 14 and the outlet pipe 18 are fixed to the end plates 24 and 20 respectively by a welding or crimping operation. The exhaust duct 10 finally comprises a plurality of fixing lugs 26 which are attached to the exhaust duct part 10 by welding.

Figure 1A:
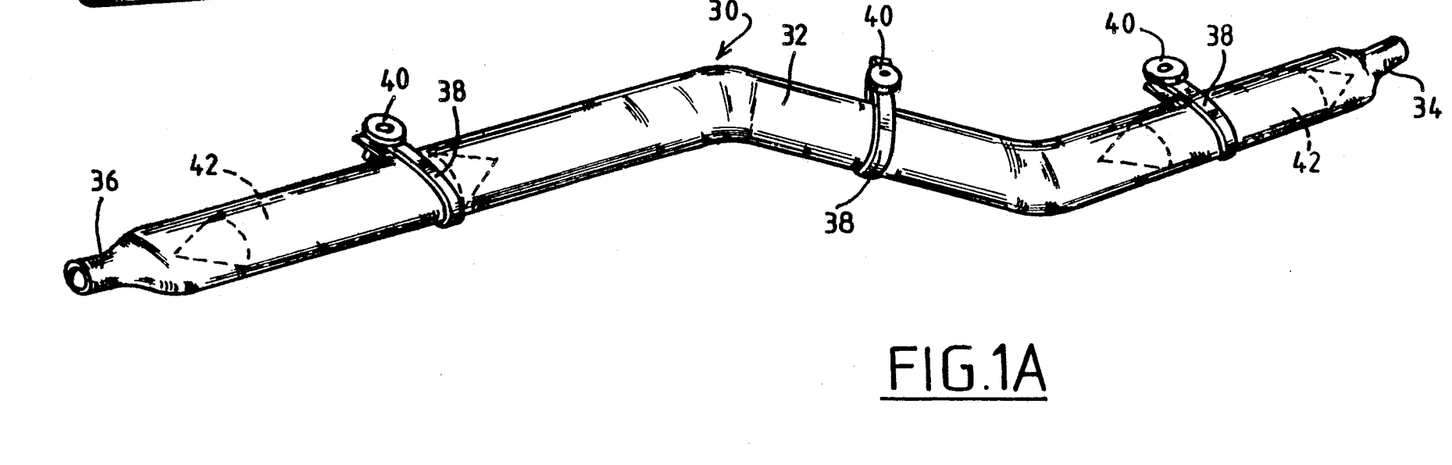
FIG. 1A is a perspective view of an exhaust duct part produced in accordance with the teachings of the invention.

The exhaust duct part 30 represented in FIG. 1A is produced in accordance with the teachings of the invention and enables the same acoustic attenuation function to be performed as that performed by the conventional exhaust duct part 10.

The exhaust duct part 30 is essentially formed by a continuous external casing 32, the cross-section of which is substantially constant over the whole length of the exhaust duct. In the embodiment represented in FIG. 1A, the cross-section of the external casing 30 is elliptical and its two ends are deformed radially so as to form an inlet pipe 34 and an outlet pipe 36 of the exhaust duct part.

The exhaust duct part 30 can easily be fitted to the body of a motor vehicle using a plurality of fixing straps 38. Each strap 38 works by clamping the external casing 32 and can be fixed to the body of the vehicle by means of a washer 40 of an elastomeric material, thus forming vibration dampers.

This mode of fixing procures a particularly important advantage relative to the fixing lugs 26 of the exhaust duct part 10 which are welded to the latter and the positioning tolerances of which are very small.

Indeed, the fixing straps 38 can slide freely relative to the external casing 32 and thus permit easy positioning of the exhaust duct part on the motor vehicle before they are finally clamped. This possibility of sliding furthermore permits the straps to adapt readily to the manufacturing tolerances of the body of the vehicle and thus to the variations in spacing of the fixing points of the various straps.

The external casing 32 contains attenuation units 42 which are positioned longitudinally inside the external casing 32.

The simplified embodiment of an exhaust duct part according to the invention and represented in FIGS. 2 and 3 will now be described in detail.

In this embodiment, the external casing 32 is a rectilinear casing of circular cross-section made from a tube inside which an acoustic attenuation unit 42 is force-fitted sleeve fashion.

Both the casing and the attenuation unit can likewise each have a cross-section of substantially elliptical profile.

The attenuation unit 42 is positioned longitudinally inside the external casing 32 in order to determine the length "l" of a transfer section 44 so that the latter participates in the acoustic attenuation function of the exhaust duct and forms a section for the propagation of the gases.

Indeed, unit 42 is arranged inside the external casing 32 in such a way that the exhaust gases entering via the inlet pipe 34 travel along a path of determined length "l" before reaching the attenuation unit 42 which is arranged inside a successive section 46 of the exhaust duct part 30.

It is thus apparent that the propagation section 44 arranged upstream of an attenuation unit 42 participates in the acoustic attenuation of the exhaust gases and does not merely form a section for transferring the gases to the location of an exhaust silencer as in the exhaust ducts of conventional design.

According to one variant, not shown, an exhaust duct in its entirety can be produced in accordance with the teachings of the invention and comprises a continuous external casing of constant, circular or elliptical cross-section which extends from the exhaust manifold of the engine as far as the outlet for discharging the exhaust gases to the atmosphere.

The external casing 32 can be produced of steel, but it is preferably produced of light alloy, for example starting from a commercially available cylindrical tube of light alloy and inside which the attenuation unit 42 is force-fitted sleeve fashion before proceeding by radial deformation of the casing 32 for the production of the inlet pipe 34 and outlet pipe 36.

The use of a light alloy or aluminum produces a very positive overall outcome, both from the point of view of the gain in terms of weight for the exhaust duct overall and as regards its resistance to corrosion.

The external casing can be produced as a spirally wound tube.

It is likewise envisaged that it can be provided with at least one continuous reinforcing cladding produced for example of a very thin sheet of stainless steel arranged on the inside and if necessary with a second continuous protective cladding arranged on the outside of the casing.

The preferred embodiment of the acoustic attenuation unit 42 represented in FIGS. 2 and 3 will now be described.

The attenuation unit 42 comprises an internal casing 50 which is perforated with holes 64 substantially over its entire surface so that the exhaust gases which surround it can communicate with its interior, which can be filled, totally or partially, with an absorbent or deadening material 52, such as, for example, wool, foam etc. to the desired density.

The internal space delimited, on the one hand, by the external peripheral surface 51 of the internal casing 50 and, on the other hand, by the internal peripheral surface 53 of the external casing 32 forms a longitudinal helicoidal peripheral channel 54 for the passage of the exhaust gases from the inlet 34 towards the outlet 36.

The internal space is divided and delimited by a continuous or limited longitudinal protruberance 56 which extends radially towards the outside from the external peripheral surface 51 of the internal casing 50 and, together with the external casing 32, with the internal peripheral surface 53 of which it comes into contact, laterally delimits the helicoidal channel 54 and permits the fixed positioning of the attenuation unit 42 inside the exhaust duct part 30 by force-fitting sleeve fashion.

Figure 2:
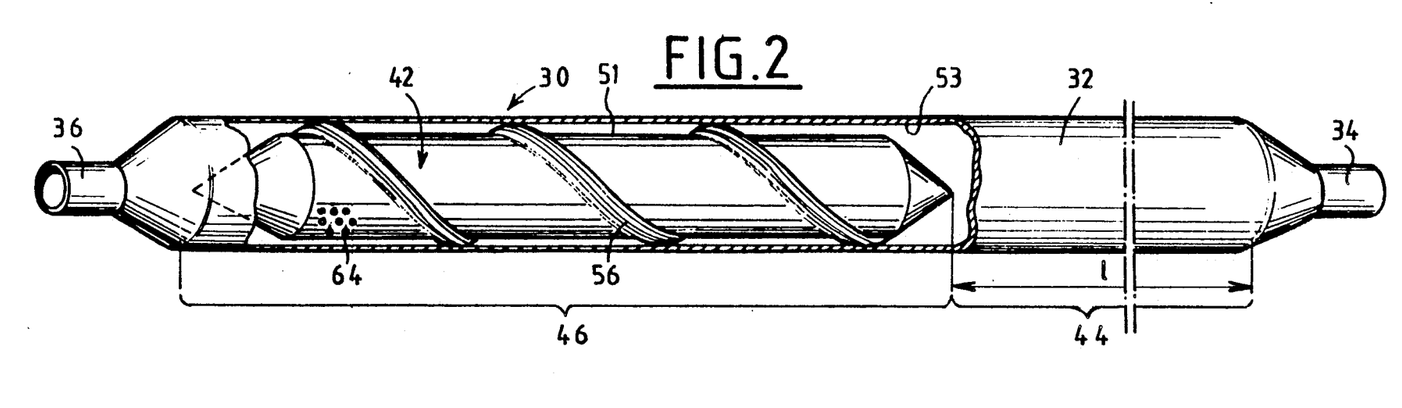
FIG. 2 is a schematic view of a rectilinear exhaust duct part according to the invention, one part of the external casing of which has been cut away to reveal an acoustic attenuation unit arranged inside.
Figure 3:
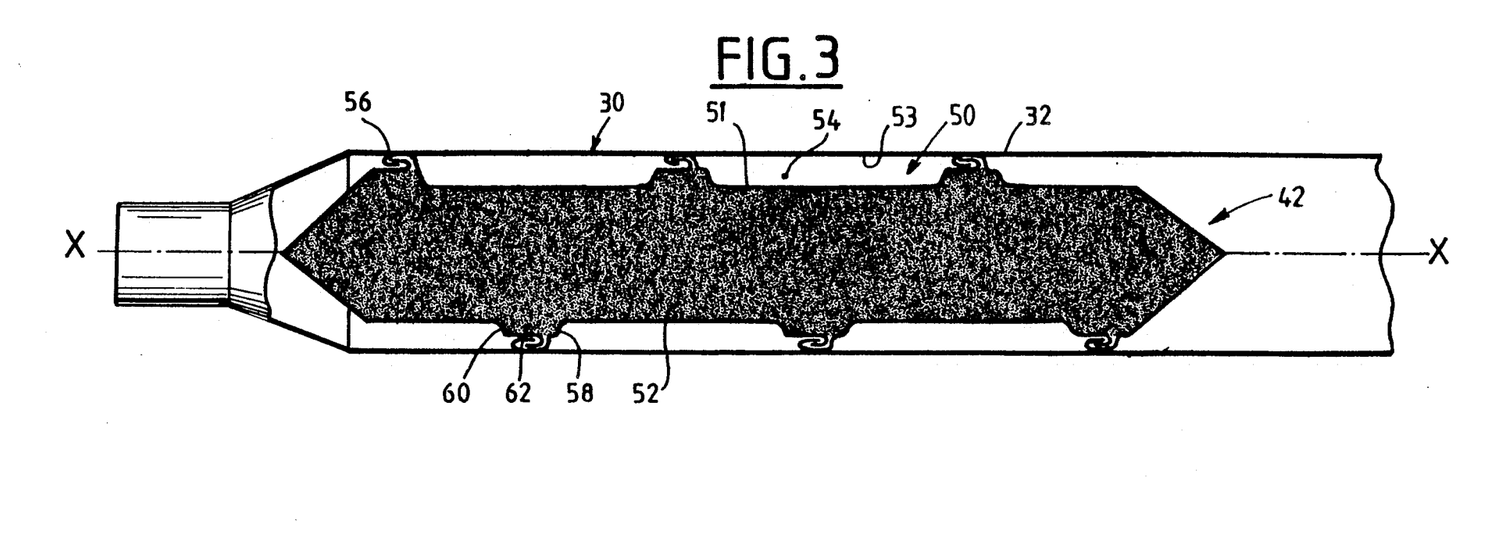
FIG. 3 is a partial view in axial section of the exhaust duct part in FIG. 2 revealing the structure of the acoustic attenuation unit.

As can be seen from FIGS. 2 and 3, the protruberance 56 extends longitudinally from the external peripheral surface 51 of the internal casing 50 around which it spirals. Thus the exhaust gases entering via the inlet 34 are guided by the protruberance 56 along a substantially helicoidal path around the central axis X—X of the section 46 containing the attenuation unit 42.

By virtue of the helicoidal arrangement of the longitudinal channel 54, the distance covered by the exhaust gases inside section 46 is particularly large.

In accordance with the invention, the surface of interaction between the exhaust gases and the internal casing 50 is very greatly increased compared to that existing in the known exhaust ducts. Furthermore, the time taken to pass through for a given length of the attenuation unit 42 can be modified as a function of the selection of the pitch of the helix of the protruberance 56. Exchange of heat in the channel 54 is very favourable and a very marked diminution of the temperature of the gases and hence of their propagation speed is observed.

The arrangement of an attenuation unit 42 of this kind inside a continuous external casing 32 of substantially constant cross-section makes it possible to avoid the creation of a deposit of condensates, such deposit escaping as it is formed, this removal greatly improving the resistance to corrosion of the exhaust duct part.

In this embodiment of the attenuation unit 42, the perforated internal casing 50 is a cylindrical tube produced by helicoidal folded seam connection of at least one continuous strip of material, for example of a strip of stainless steel sheet or of a strip of light alloy. As can be seen from FIG. 2, the profile of the continuous folded seam extending at the periphery of the internal casing 50 forms the protruberance 56 which delimits the helicoidal channel 54. This folded seam likewise ensures that the internal casing is maintained in position inside the external casing 32 by force-fitting sleeve fashion.

According to another characteristic of the invention, not shown in the drawings, it is possible to increase the passage cross-section of the exhaust gases and thus to regulate the back pressure inside the exhaust duct part 30 by producing portions deformed radially towards the inside in the shell 50 of the attenuation unit 42. By choosing the number of deformations and the depth of these deformations between the two facing folded seam portions, the passage cross-section of the gas can be modulated to regulate the back pressure, the latter likewise depending on the pitch of the helix of the folded joint 56.

As can be seen in FIG. 3, the surface of interaction between the interior volume of the internal casing and/or the absorbent material 52 and the gases circulating in the helicoidal channel 54 is particularly large by reason of the fact that the parallel opposite sides 58 and 60 of the folded seam 56, which extend in a substantially radial direction and laterally delimit the channel 54 of which they form the two lateral partition walls while at the same time permitting the connection of the unit 42 to the external casing 32 by force-fitting sleeve fashion, delimit, inside the internal casing 50, an internal space 62 inside which the absorbent material 52 extends, which is thus in contact with the internal surface of the lateral partition walls of the channel formed by the sides 58 and 60.

The exhaust duct part 30 and the attenuation unit 42 which are shown in FIGS. 2 and 3 have a cross-section whose profile is circular, but they could equally well be produced with an elliptical profile obtained by deformation of the external casing, the perimeter of the cross-section of the external casing 32 being kept constant over the length of the exhaust duct part.

In the same manner as for the external casing 32, the internal casing 50 of the attenuation unit 42 can be provided with at least one protective and reinforcing cladding, in particular in the case where the internal casing 50 is produced of a light alloy.

In the same way, a plurality of attenuation units 42 can be positioned in succession inside the external casing 32 so as to delimit propagation sections of determined lengths which participate in the acoustic attenuation function of an exhaust duct part, or of a complete exhaust duct, thus formed.

Figures 4, 5:
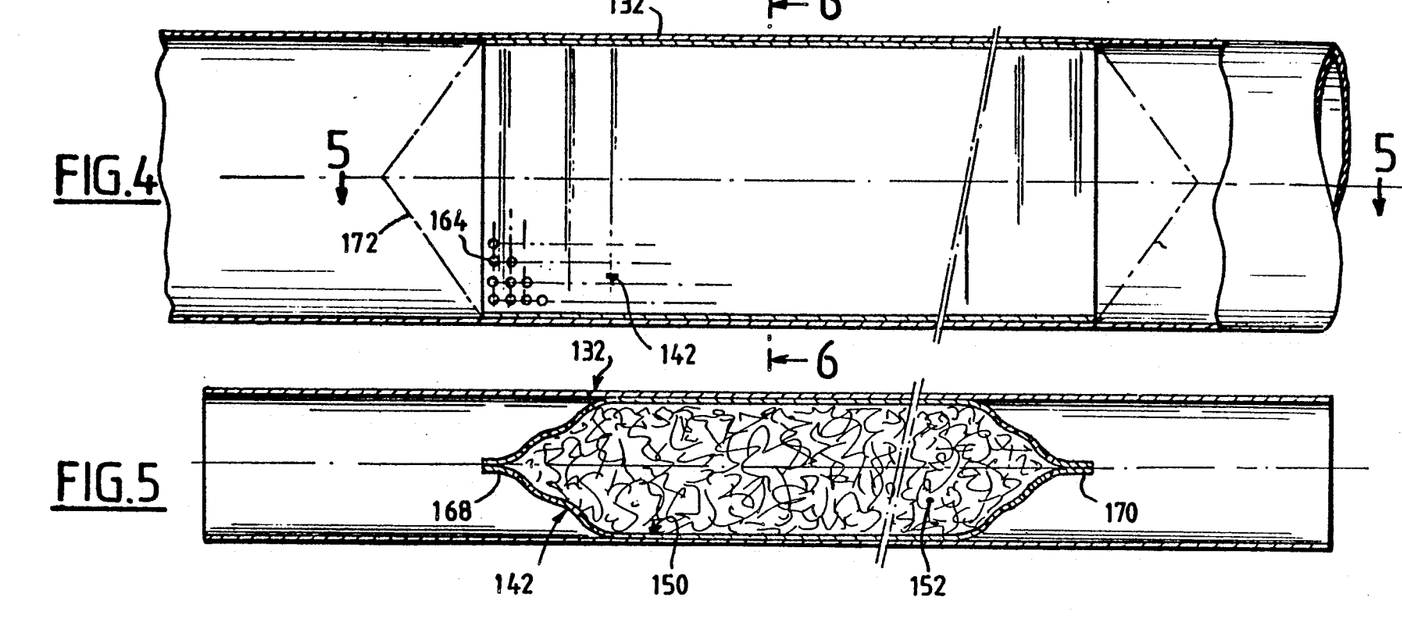
FIG. 4 is a view similar to that in FIG. 3 of another embodiment of an exhaust duct part according to the invention, the cross-section of which is elliptical and inside which another embodiment of the acoustic attenuation unit is arranged.
FIG. 5 is a view in section along the line 5—5 in FIG. 4.
Figure 6:
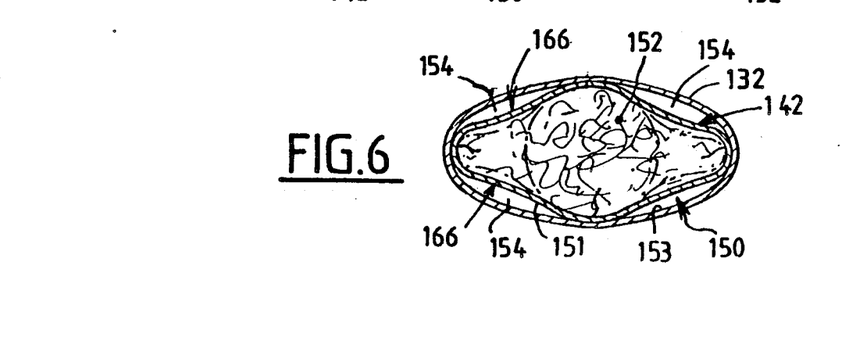
FIG. 6 is a section along the line 6—6 in FIG. 4.

Another embodiment of an acoustic attenuation unit used in an exhaust duct in accordance with the teachings of the invention is represented in FIGS. 4 to 6. Elements which are identical or equivalent to those of the embodiment represented in FIGS. 2 and 3 are designated by the same reference numerals, incremented by 100.

The section represented by FIGS. 4 to 6 comprises an external casing 132, in this example of oval cross-section, inside which an attenuation unit 142 is arranged. The attenuation unit 142 comprises a tubular internal casing 150, of out-of-round cross-section, perforated by a multiplicity of holes 164 and filled with an absorbent material 152, and four rectilinear longitudinal channels 154 which are enclosed between the internal peripheral wall 153 of the continuous external casing 132 and the external peripheral wall 151 of the internal casing 150.

The internal casing 150 is force-fitted sleeve fashion in the external casing 132 and the channels 154 are obtained by virtue of zones 166 of the internal casing which extend radially towards the inside and are obtained by mechanical deformation to the internal casing 150. The zones or parts of the internal casing which separate two contiguous channels 154 are force-fitted sleeve fashion in the external casing 132 and secure the longitudinal positioning of the attenuation unit 142 inside the external casing 132.

In this embodiment, the deformed zones 166 likewise permit an increase in the surface of exchange with the absorbent material as compared to a casing of circular profile such as that represented by a dot-and-dash line in FIG. 6. The internal volume of the internal casing and/or the absorbent material is thus in contact with the internal surface of the deformed zones 166 which extend in parallel and in pairs on each side of the circle formed by the dot-and-dash line, illustrating well the considerable increase in the surface of exchange between the gases and the absorbent material.

The ends 168 and 170 of the internal casing 150 are closed and connected to a central part 172 by zones of approximately triangular longitudinal section which are visible in FIG. 4 and are obtained by deformation.

Viewed from above, the ends 168 and 170 of the internal casing 150 can, as a variant, have a triangular shape corresponding to a conical volume. In another variant, the internal casing may not be closed at its ends, depending on the absorbent material used. Thus plastic foams which have a very good behaviour do not require the closure of the ends of the internal casing 150.

An appropriate choice of the length and passage cross-section of the channels 154 furthermore makes it possible to regulate the back pressure of the exhaust duct part 30.

As in the embodiment represented in FIGS. 2 and 3, the external casing 132 and the internal casing 150 can be produced from light alloy and be provided with one or two reinforcing or protective claddings.

In cross-section and in the various embodiments represented in the drawings it is particularly important to note that, according to the invention, the length of the contour of the external peripheral surface of the internal casing along which the gas/internal casing interaction takes place is greater than or equal to the length of the contour of the internal peripheral surface of the casing along which the gas/external casing interaction takes place.

all cases, the external peripheral surface of the internal casing which is in contact with the gas is always greater than the plain circular cylindrical surface which the internal casing would have if it were produced in accordance with the teachings of patent FR-A-1,301,056.

In the embodiment represented in FIGS. 2 and 3, the ratio of the radial dimension (vertically with regard to FIG. 3) of the axial section of the channel 54 to the dimension of the axial length of this section is between 1 and 0.1.

In accordance with the invention, and in order to shape the exhaust duct part into a shape which permits it to fit the space provided for its mounting on the lower part of the body of a motor vehicle, it can be produced in two successive stages.

In the course of a first stage, the acoustic attenuation unit or units is/are positioned and fixed inside a rectilinear external casing, for example formed by a cylindrical tube. In the course of a second stage, the rectilinear external casing is bent as is/are, if need be, the attenuation unit or units which is/are arranged in it and which would be situated in a bend of the bent exhaust duct part.

In certain applications, it may be necessary to at least partially deform the external casing in order to modify the profile of its cross-section, while at the same time keeping its perimeter constant.

To this end, the exhaust duct part is produced by prior positioning and fixing of the acoustic attenuation unit or units inside an external casing. Then, during a second stage, this external casing is at least partially deformed in order to modify the profile with a view, for example, to flattening it partially and/or rendering it elliptical.

In the case where the exhaust duct part comprises a plurality of successive attenuation units of the same type as that which is represented in FIGS. 2 and 3 and each of which comprises a helicoidal longitudinal peripheral channel, it is possible to choose units the pitch of whose spiral is different from one unit to the other in order to modify the variation of the pressure and the speed at which the gases circulate inside the exhaust duct as it passes through the latter.

The production of complete exhaust ducts according to the invention is particularly advantageous in application on vehicles in which one exhaust manifold can be connected to several exhaust ducts. If, for example, the engine is a four-cylinder engine, the cylinders can be grouped in twos by means of two Y-shaped manifolds, each of which is connected to its own reduced cross-section exhaust duct. This arrangement avoids a considerable loss of power such as would occur due to connection of the four cylinders to a common outlet. The two exhaust ducts can have a parallel course or a symmetrical course on the underside of the floor of the vehicle.

I claim:

1. In a part of an elongated exhaust duct for outflow of a fluid, particularly for outflow of exhaust gases from an engine, said exhaust duct part comprising a continuous elongated external casing having a constant cross section throughout substantially an entire length thereof, and at least one acoustic attenuation unit positioned within said external casing at a location such that a fluid transfer section of said external casing that leads to said acoustic attenuation unit is of a length sufficient to enable said fluid transfer section to participate in providing acoustic attenuation for said exhaust duct part, said acoustic attenuation unit comprising an elongated internal casing adapted to include sound deadening material and having an outer surface that defines with an inner surface of said external casing at least one longitudinal channel defining therein a space for the passage of the fluid, the improvement wherein:

said internal casing has a transverse cross-sectional configuration that is of substantially constant area throughout substantially an entire length of said internal casing;

said at least one longitudinal channel is defined by at least a portion of said internal casing being in contact with said inner surface of said external casing; and said portion of said internal casing, which is in contact with said inner surface of said external casing, comprising at least one zone of said internal casing deformed radially outwardly along substantially said entire length of said internal casing and defining a radially outwardly projecting space within said internal casing so as to create an increased surface contact area between said acoustic attenuation unit and said space defined within said at least one longitudinal channel, said outwardly projecting space being adapted to include the sound deadening material.

2. The improvement claimed in claim 1, wherein said internal casing includes at least one additional deformed zone deformed radially inwardly along substantially an entire length of said internal casing.

3. The improvement claimed in claim 1, wherein said at least one radially outwardly deformed zone defines two elongated walls that form said radially outwardly projecting space in communication with a remainder of an interior of said internal casing.

4. The improvement claimed in claim 3, wherein said interior of said internal casing contains sound deadening material extending into said radially outwardly projecting space.

5. The improvement claimed in claim 1, wherein said internal casing is formed by a folded seam resulting from connection of edges of at least one strip of material, and said deformed zone is defined by said folded seam extending from the periphery of said internal casing.

6. The improvement claimed in claim 5, wherein said folded seam is of helicoidal shape, and said longitudinal channel is of helicoidal shape.

7. The improvement claimed in claim 1, wherein said deformed zone comprises a helicoidal protrusion extending from said internal casing, and said longitudinal channel is of helicoidal shape.

8. The improvement claimed in claim 1, wherein, as viewed in axial cross section, the ratio of the radial dimension of said longitudinal channel to the axial dimension thereof is between 1 to 0.1.

9. The improvement claimed in claim 1, wherein said internal casing is perforated over substantially its entire surface.

10. The improvement claimed in claim 9, wherein said internal casing contains sound deadening material in an interior thereof.

11. The improvement claimed in claim 1, wherein said external casing comprises a tubular member, and said internal casing is force fit within said tubular member by said radially outwardly deformed zone of said internal casing in contact with said inner surface of said external casing.

12. The improvement claimed in claim 1, wherein said internal casing is of substantially tubular configuration, and said deformed zone results from mechanical radial deformation of said tubular internal casing.

13. The improvement claimed in claim 1, wherein a lateral cross section of said external and internal casing is such that a contour of said outer surface of said box member forming said surface contact area is at least equal in length to a contour of said inner surface of said external casing.

14. The improvement claimed in claim 13, wherein said contour of said outer surface of said internal casing forming said surface contact area is greater in length than said contour of said inner surface of said external casing.

15. The improvement claimed in claim 1, wherein at least one of the ends of said external casing is deformed to define an inlet or an outlet connection.

16. The improvement claimed in claim 1, wherein said external casing is formed of a light alloy material.

17. The improvement claimed in claim 1, wherein said internal casing is formed of a light alloy material.

18. The improvement claimed in claim 1, wherein said at least one accoustic attenuation unit comprises a plurality of acoustic attenuation units positioned within said external casing at spaced locations to define respective attenuation sections of predetermined lengths.

19. The improvement claimed in claim 1, wherein said exhaust duct part comprises an entire exhaust duct for an engine and includes an inlet end for connection to an exhaust manifold of the engine and an outlet end for direction discharge of exhaust gases of the engine to the atmosphere.

20. The improvement claimed in claim 1, wherein said transverse cross-sectional configuration of said internal casing is circular or elliptical.

21. An engine comprising at least two exhaust outlets, each of said at least two exhaust outlets having attached thereto a respective exhaust duct part for outflow of exhaust gases from the engine, each said exhaust duct part comprising a continuous elongated external casing having a constant cross section throughout substantially an entire length thereof, and at least one acoustic attenuation unit positioned within said external casing at a location such that a fluid transfer section of said external casing that leads to said acoustic attenuation unit is of a length sufficient to enable said fluid transfer section to participate in providing acoustic attenuation for said exhaust duct part, said acoustic attenuation unit comprising an elongated internal casing adapted to include sound deadening material and having an outer surface that defines with an inner surface of said external casing at least one longitudinal channel defining therein a space for the passage of the exhaust gases, the improvement wherein:

said internal casing has a transverse cross-sectional configuration that is of substantially constant area throughout substantially an entire length of said internal casing;

said at least one longitudinal channel is defined by at least a portion of said internal casing being in contact with said inner surface of said external casing; and said portion of said internal casing which is in contact with said inner surface of said external casing, comprising at least one zone of said internal casing deformed radially outwardly along substantially said entire length of said internal casing and defining a radially outwardly projecting space within said internal casing so as to create an increased surface contact area between said acoustic attenuation unit and said space defined within said at least one longitudinal channel, said outwardly projecting space being adapted to include the sound deadening material.

22. An apparatus comprising:

an elongated exhaust duct having a continuous elongated external casing having a substantially constant transverse cross-section along substantially an entire length thereof;

at least one acoustic attenuation unit mounted within said external casing and comprising an elongated internal casing adapted to include sound deadening material and having an interior, an outer surface, a substantially constant transverse cross-section along substantially an entire length of said internal casing, and at least one elongated zone, formed along substantially said entire length of said internal casing, said zone being deformed radially outwardly and defining two elongated sidewalls that form an internal space in communication with a remainder of said interior of said internal casing, an outer surface of said at least one elongated deformed zone contacting an inner surface of said elongated external casing, said internal space being adapted to include the sound deadening material; and at least one elongated longitudinal channel through which exhaust gases are adapted to flow being defined by said outer surface of said at least one elongated zone, a remainder of said outer surface of said elongated internal casing and said inner surface of said elongated external casing.

23. An apparatus as recited in claim 22, wherein said transverse cross-section of said internal casing is circular or elliptical.

24. An apparatus as claimed in claim 22, wherein sound deadening material is disposed in said interior of said internal casing and extends into said internal space formed by said two elongated sidewalls.

25. An apparatus as claimed in claim 22, wherein said internal casing is formed by a folded seam resulting from connection of edges of at least one strip of material, and said deformed zone is defined by said folded seam extending from a periphery of said internal casing.

26. An apparatus as claimed in claim 25, wherein said folded seam is of helicoidal shape, and said longitudinal channel is of helicoidal shape.

27. An apparatus as claimed in claim 22, wherein said deformed zone comprises a helicoidal protrusion extending from said internal casing, and said longitudinal channel is of helicoidal shape.

28. An apparatus as claimed in claim 22, wherein, a ratio of the radial dimension of said longitudinal channel to an axial dimension thereof is between 1 and 0.1.

29. An apparatus as claimed in claim 22, wherein said internal casing is perforated over substantially said outer surface thereof.

30. An apparatus as claimed in claim 29, wherein sound deadening material is disposed in said interior of said internal casing and extends into said internal space formed by said two elongated sidewalls.

31. An apparatus as claimed in claim 22, wherein said external casing comprises a tubular member, and said internal casing is force fit within said tubular member by said radially outwardly deformed zone of said internal casing in contact with said inner surface of said external casing.

32. An apparatus as claimed in claim 22, wherein said internal casing is of substantially tubular configuration, and said deformed zone results from mechanical radial deformation of said tubular internal casing.

33. An apparatus as claimed in claim 22, wherein a lateral cross-section of said external and internal casings is such that a contour of said outer surface of said internal casing is at least equal in length to a contour of said inner surface of said external casing.

34. An apparatus as claimed in claim 33, wherein said contour of said outer surface of said internal casing is greater in length than said contour of said inner surface of said external casing.

35. An apparatus as claimed in claim 22, wherein at least one of the ends of said external casing is deformed to define an inlet or an outlet connection.

36. An apparatus as claimed in claim 22, wherein said external casing is formed of a light alloy material.

37. An apparatus as claimed in claim 22, wherein said internal casing is formed of a light alloy material.

38. An apparatus as claimed in claim 22, wherein said at least one acoustic attenuation unit comprises a plurality of acoustic attenuation units positioned within said external casing at spaced locations to define respective attenuation sections of predetermined lengths.

39. An apparatus as claimed in claim 22, wherein said exhaust duct part comprises an entire exhaust duct for an engine and includes an inlet end for connection to an exhaust manifold of the engine and an outlet end for direct discharge of exhaust gases from the engine.

40. A process for providing acoustic attenuation for an exhaust duct part, said process comprising the steps of:

providing a continuous substantially rectilinear elongated external casing having a constant cross section throughout substantially an entire length thereof;

providing at least one elongated acoustic attenuation unit comprising an elongated internal casing adapted to include a sound deadening material and having a transverse cross-sectional configuration that is of substantially constant area throughout an entire length of said internal member, with said box member having at least one radially outwardly deformed zone that extends over substantially said entire length of said internal casing and defines a radially outwardly projecting space within said internal casing adapted to include the sound deadening material; and fixedly positioning said internal casing within said external casing with an outer surface of said at least one deformed zone being in contact with an inner surface of said external casing, and thereby defining between said inner surface of said external casing and an outer surface of said internal casing at least one longitudinal channel for passage therethrough of the fluid.

41. A process as claimed in claim 40, wherein said step of fixedly positioning comprises force fitting said internal casing within said external casing such that said outer surface of said at least one deformed zone of said internal casing is in force fit contact at plural locations with said inner surface of said external casing.

42. A process as claimed in claim 40, further comprising the step of bending said external casing with said acoustic attenuation unit therein.

43. A process as claimed in claim 40, further comprising the steps of constructing said external casing of a circular cross section, and, after fixedly positioning said internal casing within said external casing, at least partially deforming said external casing such that the cross section thereof no longer is circular.

44. A process as claimed in claim 40, wherein said transverse cross-sectional configuration of said internal casing is circular or elliptical.

* * * * *

UNITED STATES PATENT AND TRADEMARK OFFICE
CERTIFICATE OF CORRECTION

PATENT NO. : 4,993,512
DATED : February 19, 1991
INVENTOR(S) : Henri Lescher It is certified that error appears in the above-identified patent and that said Letters Patent is hereby corrected as shown below:

On the front page, left column, item [73], change "Glaenzer Spicer, Poissy, France" to --one-half interest to Glaenzer, Spicer, Poissy, France--.

Signed and Sealed this

Sixteenth Day of July, 1991

*Attest:*

HARRY F. MANBECK, JR.

*Attesting Officer*    *Commissioner of Patents and Trademarks*